Figure 1:
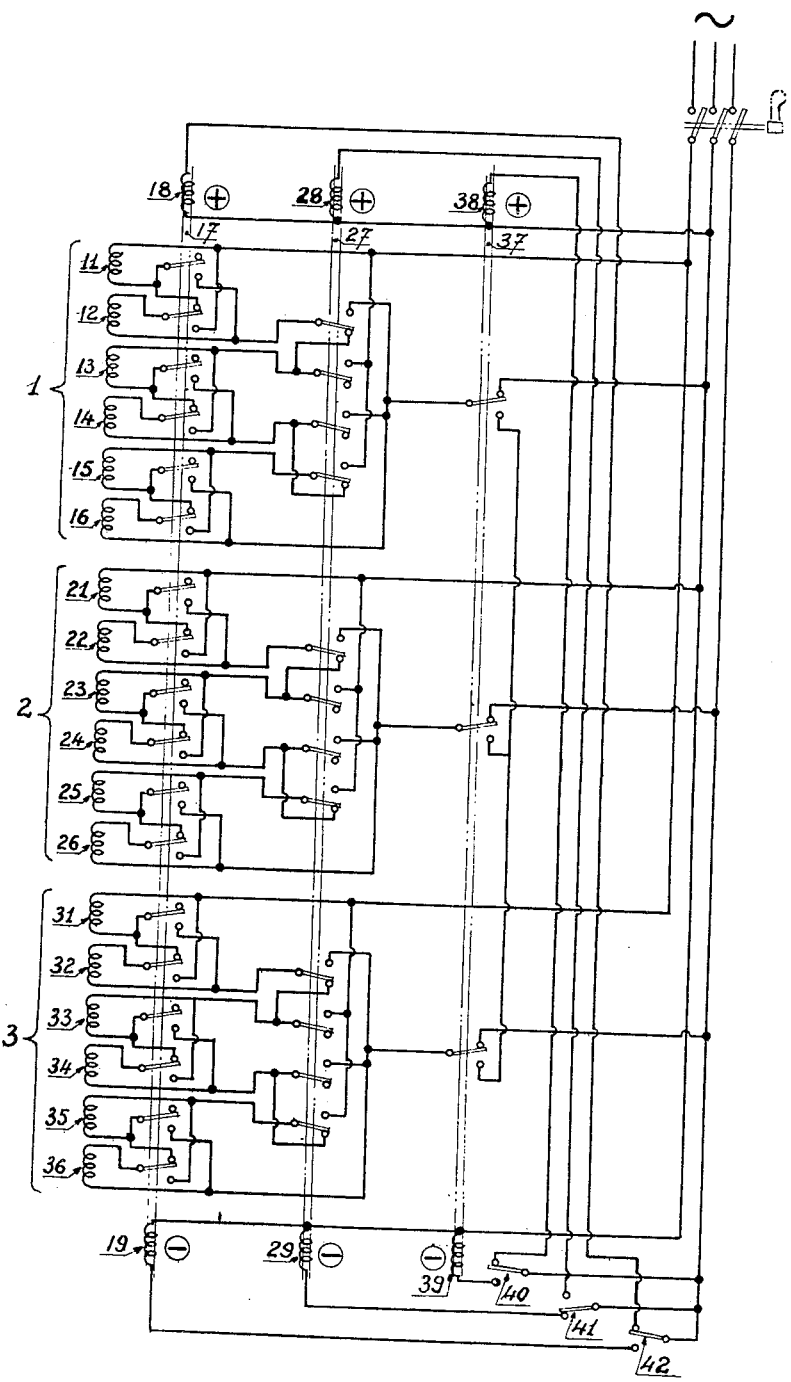

United States Patent Office 2,713,656
Patented July 19, 1955

2,713,656

ELECTRIC MOTOR FOLLOW-UP SYSTEM

Stanley George Meadows, Hornchurch, and Robert Norman Saxby, Liverpool, England, assignors to Southern United Telephone Cables Limited, Dagenham Dock, England, a British company Application April 2, 1953, Serial No. 346,316

Claims priority, application Great Britain April 8, 1952

3 Claims. (Cl. 318—29)

This invention relates to the automatic obtaining of balance in an electric circuit, which, for instance, may be a circuit of the bridge type, by the adjustment of the value of some circuit value represented by a circuit element, or group of elements, therein. In such an arrangement the condition of balance is determined by the state of a branch (the detector branch) of the circuit, for instance the diagonal of a bridge, in which the current becomes zero when balance is obtained. We use, in conjunction with such a branch a sensitive polarised relay arranged to be influenced by the flow of current in that branch, or by the potential difference producing that flow. In this relay is a centre contact movable between two side contacts and making contact with one or wtih the other in accord with the direction of flow of current in its exciting coil. When balance is obtained the movable contact occupies the centre position in which both sides of its circuit are opened. We also employ a reversible motor device which produces the adjustment of the circuit element or elements concerned, this device being arranged to be brought to rest when balance is obtained.

The arrangement of the apparatus is such that balance of the circuit is always approached and obtained when the motor device is moving in one pre-determined sense after having moved in the opposite sense. This preceding opposite movement has the effect of preparing part of the stopping circuit which becomes effective after the reversal of movement.

It will be seen that in this procedure the adjustment of the circuit element, or elements, is taking place in the sense away from balance at some preliminary part of the procedure and is then reversed to go towards and bring about the conditions for balance. If by chance the initial movement when the apparatus comes into operation is towards balance it is made to continue past the point of balance and move away therefrom in order that the required sequence of events may take place.

It is preferred to arrange the control circuit of the polarised relay in such a way that the sense of movement of the relay is determined by the condition whether increase or decrease of potential difference in the detector branch of the circuit is taking place. That is, it depends not on the potential difference itself but on whether its rate of change is positive or negative. This effect can be obtained by connecting the coil of the sensitive relay in series with a condenser in the charging and discharging circuit thereof and applying to that circuit the potential difference in the detector branch or some derived potential difference. When this potential difference is increasing the condenser is being charged and the current through the relay is, therefore, flowing in the charging direction. On the other hand, when the potential difference is falling, the condenser is being discharged and the current is flowing through the relay in the reverse direction.

For use with an alternating current circuit, for which the apparatus is primarily intended, the out-of-balance potential difference, after amplification if necessary, is rectified and applied to the condenser circuit, preferably through an impedance transformer, for instance an electronic valve connected as a cathode follower, in order to avoid disturbance of conditions in the preceding circuits by the comparatively large currents of the condenser circuit.

The invention will be further described with reference to a particular example illustrated by the accompanying circuit diagram. In this example the circuit to be balanced is a bridge A used for testing capacities, for instance the capacity between the quads of a communication cable. The output from the bridge A is fed to an amplifier B and the output from the amplifier is fed to a balance control circuit D which is susceptible to the condition of the bridge.

The bridge A comprises two inductive arms N, N connected between points 5, 8, and 5, 7 respectively. It also comprises two capacitive arms connected between points 8, 6, and 7, 6 respectively. The bridge output is obtained from a pick-up coil L inductively coupled to the inductors N, N and feeding the amplifier B over leads 23, 24. The unknown capacity X to be tested is connected in the arm 6, 7 and a standard capacity S is connected in the other capacitive arm 6, 8. An A. C. potential $f$ is applied to the bridge across the points 5 and 6. The bridge is balanced by means of an adjustable element W comprising a differential condenser with one fixed plate 10 connected to the point 8, the other fixed plate 11 connected to point 7 and the movable plate 9 connected to the point 6. This adjustable element thus provides two adjustable capacities, one in parallel with the standard S and the other in parallel with the unknown X. When the bridge is balanced the setting of the differential condenser W provides a measure of the difference between the capacities of the standard S and unknown X. The movable plate 9 is driven through a shaft 12 by means of an electromagnetically actuated reversible clutch 33 from a continuously running motor 21. On the shaft 12 are fixed two friction discs 16 and 17. On the motor spindle 20 extending between the discs 16 and 17 and transversely to the axis of the shaft 12, and between the discs 16 and 17, is fixed a friction driving disc 18. An extension of the spindle 20 is engaged by centralising springs 19 which normally hold it in the position of non-engagement between the driving disc 18 and the other disc 16 and 17. The end of the spindle 20 carries an armature 22. The spindle 20 is sufficiently flexible to permit the driving disc 18 to be brought into engagement with either of the discs 16 and 17 by energising one or the other of clutch magnets MI and MJ disposed one each side of the spindle 20 to attract the armature 22 in the appropriate direction. The electromagnets MI and MJ are permanently connected to a D. C. supply G and are separately energised by completing a circuit to earth E through a common switch MK2 and a two-way switch providing two positions BB2 and BB3. In the drawing the circuit is shown in the unenergised condition in which MK2 is open and BB3 is closed in the circuit to the "anticlockwise" magnet MJ.

It is required to lock the movable plate 9 of the differential condenser W when the position of balance is attained. For this purpose there is fixed to the shaft 12 a notched disc 13 and a spring 15 normally maintains a pivoted locking latch 1 in locking engagement with the disc. The latch 14 is drawn out of the locking position by an electromagnet M when this is energised by closing a switch MK1 controlled by arrangements to be described hereinafter. The switch MK1 is closed while the adjustment of the bridge is taking place.

adjustable to obtain a balanced condition and a circuit branch across which the potential difference becomes zero at balance, the arrangement of a polarised relay having a centre zero open position and two side contact-making positions, a condenser and means for applying to said condenser a potential difference derived from the potential difference across said branch circuit, an operating coil for said relay in series with said condenser, a reversible driving means operating on said adjustable circuit element and a control circuit with means for initiating the movement of said driving means always in the same sense, said control circuit including said relay contacts, means for reversing the sense of said drive at the making of one of the side contacts of said relay and thereby to cause the making of the second of said side contacts and means prepared for stopping said drive by the closing of said second side contacts, said last means being operative to stop the drive at the breaking of contact at the second of the side contacts of said relay.

3. In an automatic balancing electric circuit comprising a circuit element adjustable to obtain balance and a circuit branch in which the potential difference becomes zero at balance, the arrangement of a polarised relay having a centre zero open circuit position and two side contact-closing positions, means for applying to said relay a current derived from said potential difference, a reversible drive for said adjustable element and a control circuit with means for initiating said drive always in the same pre-determined sense, means actuated by said relay in a first contact-closing position for reversing the drive from that sense, a stopping circuit, and means actuated by the relay in the second contact closed position to prepare said stopping circuit, an over-riding holding circuit for said control circuit and means actuating by said stopping circuit for applying said over-riding holding circuit to said control circuit when the relay moves to the second contact closing position, and the said stopping circuit being operative to release said over-riding holding circuit to bring the drive to rest when the relay moves from the second contact closed position into the centre zero position.

References Cited in the file of this patent

UNITED STATES PATENTS

| | | |
|---|---|---|
| 2,460,276 | Bernas | Feb. 1, 1949 |
| 2,471,075 | Montrose-Oster | May 24, 1949 |
| 2,508,162 | Herwald | May 16, 1950 |
| 2,534,801 | Siltamaki | Dec. 19, 1950 |
| 2,674,707 | De Mott | Apr. 6, 1954 |